US012578440B2

(12) United States Patent
Vignetti et al.

(10) Patent No.: US 12,578,440 B2
(45) Date of Patent: Mar. 17, 2026

(54) INDIRECT TIME-OF-FLIGHT (ITOF) SENSOR

(71) Applicant: STMicroelectronics (Crolles 2) SAS, Crolles (FR)

(72) Inventors: Matteo Maria Vignetti, Aix les Baines (FR); Pierre Malinge, Bernin (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 1028 days.

(21) Appl. No.: 17/704,481

(22) Filed: Mar. 25, 2022

(65) Prior Publication Data

US 2022/0308190 A1 Sep. 29, 2022

(30) Foreign Application Priority Data

Mar. 29, 2021 (FR) ...................................... 2103217

(51) Int. Cl.
*G01S 7/4865* (2020.01)
(52) U.S. Cl.
CPC .................................. *G01S 7/4865* (2013.01)
(58) Field of Classification Search
CPC .... G01S 7/4863; G01S 7/4865; G01S 7/4914; G01S 17/894
See application file for complete search history.

(56) References Cited

U.S. PATENT DOCUMENTS

| | | | |
|---|---|---|---|
| 7,772,627 B2 | 8/2010 | Hong | |
| 2014/0198183 A1 | 7/2014 | Kim et al. | |
| 2017/0142362 A1* | 5/2017 | Liu | H04N 25/78 |
| 2019/0148448 A1 | 5/2019 | Lee | |
| 2019/0181171 A1* | 6/2019 | Tadmor | H10F 39/807 |
| 2022/0375969 A1* | 11/2022 | Yorikado | H10F 30/221 |

FOREIGN PATENT DOCUMENTS

WO 2020234645 A1 11/2020

OTHER PUBLICATIONS

INPI Search Report and Written Opinion for priority application, FR Appl. No. 2103217, report dated Dec. 7, 2021, 8 pages.

* cited by examiner

*Primary Examiner* — Thanh Luu
(74) *Attorney, Agent, or Firm* — Crowe & Dunlevy LLC

(57) ABSTRACT

An indirect time-of-flight (iTOF) includes a pixel with a photoconversion area, a readout circuit and at least two circuit sets. Each circuit set includes: a capacitive element connected to a first node of the circuit set; a controllable charge transfer device connected between a first electrode of the photoconversion area and the first node; and a first transistor having a gate connected to the first node, a source connected to the readout circuit and a drain configured to receive a bias potential. The capacitive element is configured to store a voltage in response to charges generated by the photoconversion area.

18 Claims, 2 Drawing Sheets

INDIRECT TIME-OF-FLIGHT (ITOF) SENSOR

PRIORITY CLAIM

This application claims the priority benefit of French Application for Patent No. 2103217, filed on Mar. 29, 2021, the content of which is hereby incorporated by reference in its entirety to the maximum extent allowable by law.

TECHNICAL FIELD

The present disclosure relates generally to electronic circuits and, in particular, to indirect time-of-flight (iTOF) type sensors.

BACKGROUND

In an indirect time-of-flight (iTOF) sensor, during an integration phase, light modulated periodically in amplitude is emitted towards a scene. The modulated light, after being reflected by the scene, is then received by the pixels of the sensor. In each pixel, the received light causes photogeneration of charges in a photoconversion area of the pixel.

In known indirect time-of-flight sensors, during the integration phase, the photogenerated charges are periodically transferred to several different pinned memories at the same frequency, for example, the modulation frequency of the emitted light, but with a different phase relative to the modulation frequency of the emitted light. From the differences in charge quantities stored in the pinned memories of a pixel at the end of the integration period, a phase shift between the emitted light and the light received by the pixel is determined, and a distance between the pixel and a point in the scene that has reflected light toward that pixel can be derived from this phase shift.

Known indirect time-of-flight sensors have various drawbacks.

There is a need to overcome some or all of the disadvantages of known indirect time-of-flight sensors.

SUMMARY

One embodiment addresses all or some of the drawbacks of known indirect time-of-flight sensors.

One embodiment provides for an indirect time-of-flight type sensor comprising a plurality of pixels each having: a photoconversion area; a readout circuit; and at least two sets each including: a capacitive element connected to a first node of said assembly, a controllable charge transfer device connected between a first electrode of the photoconversion area and said first node, and a first transistor having a gate connected to the first node, a source connected to the readout circuit and a drain configured to receive a bias potential.

According to one embodiment, each set of each pixel further comprises a switch having a first conduction terminal connected to the first node of said set and a second conduction terminal configured to receive an initialization potential of the first node.

According to one embodiment, in each set of each pixel, the capacitive element comprises an intrinsic capacitance of the first node of said set.

According to one embodiment, in each set of each pixel, the capacitive further comprises a capacitor having a first electrode connected to the first node of said set and a second electrode configured to receive a reference potential.

According to one embodiment, during each readout phase of the sensor, in each pixel and for each set of the pixel, the readout circuit is configured to provide a signal representing a first value of a voltage of the first node of said set, from a source voltage of the first transistor of said set at the end of a light integration phase preceding said readout phase.

According to one embodiment, during each readout phase of the sensor, in each pixel and for each set of the pixel, the readout circuit is further configured to provide a signal representing a second value of the voltage of the first node of said set, from a voltage of the source of the first transistor of said set at the end of an initialization phase preceding the integration phase that precedes said readout phase.

According to one embodiment, in each pixel, for each set of the pixel, the readout circuit comprises: a first capacitor related to said set, and a first switch related to said set, the first switch being connected between the first capacitor and an internal node of the readout circuit, said internal node being coupled to the source of the first transistor of said set.

According to one embodiment, in each pixel, for each set of the pixel, the readout circuit further comprises: a second capacitor related to said set, and a second switch related to said set, the second switch being connected between the second capacitor and said internal node.

According to one embodiment, in each pixel, said internal node of the readout circuit is distinct for each set of said pixel and is coupled to the source of the first transistor of said set by a switch of the readout circuit.

According to one embodiment, in each pixel, for each set of the pixel, the readout circuit comprises: a transistor having its gate connected to said internal node and a drain configured to receive a bias potential; and a switch connected between the source of said transistor and an output of the pixel.

One embodiment provides a method for driving an indirect time-of-flight type sensor comprising a plurality of pixels each comprising: a photoconversion area, a readout circuit; and at least two sets each comprising: a capacitive element connected to a first node of said set, a controllable charge transfer device connected between a first electrode of the photoconversion area and the first node, and a first transistor having a gate connected to the first node, a source connected to the readout circuit and a drain configured to receive a bias potential. The method comprises: during each integration phase of the light by the sensor, in each set of each pixel, periodically activating the transfer device of said set to periodically transfer charges from the photoconversion area to the capacitive element of said set; and during a sensor readout phase implemented after each integration phase, obtaining, by the readout circuit of each pixel and for each set of said pixel, a signal representing a first value of a voltage of the first node of said set, from a source voltage of the first transistor of said set at the end of the integration phase preceding said readout phase.

According to one embodiment, for each set of each pixel, the method further comprises: an initialization phase of the voltage of the first node of said set implemented before each integration phase, preferably simultaneously in all the pixels; and during the readout phase implemented after each integration phase, obtaining, by the readout circuit of said pixel and for each set of said pixel, a signal representing a second value of the voltage of the first node of said set, from the voltage of the source of the first transistor of said set at the end of the initialization phase preceding the integration phase that precedes said readout phase.

According to one embodiment, for each set of each pixel, obtaining the signal representative of said first value comprises: at the end of each integration period, switching to the off state, preferably simultaneously in all pixels, a first switch of the readout circuit to store a voltage at the terminals of a first capacitor of the readout circuit, the first capacitor and the first switch being related to said set, the first switch being connected between said first capacitor and an internal node of the readout circuit, said internal node being coupled to the source of the first transistor of said set, and the stored voltage being indicative of the voltage of the source of the first transistor of said set at the end of said integration phase; and during the readout phase following said integration phase, obtaining said signal by switching to the on state the first switch related to said assembly to read the stored voltage across the first capacitor.

According to one embodiment, for each set of each pixel, obtaining the signal representative of the second value comprises: at the end of each initialization phase, switching to the off state, preferably simultaneously in all pixels, a second switch of the readout circuit to store a voltage at the terminals of a second capacitor of the readout circuit, the second capacitor and the second switch being related to said set, the second switch being connected between said second capacitor and the internal node coupled to the source of the first transistor of said set, and the stored voltage being indicative of the voltage of the source of the first transistor of said set at the end of the initialization phase; and during the readout phase following the integration phase that follows said readout phase, obtaining said signal by switching to the on state the second switch related to said assembly to read the stored voltage at the terminals of the second capacitor.

According to one embodiment, for each set of each pixel, the readout circuit comprises a switch connected between the source of the first transistor of said set and the internal node to which the source of the first transistor of said set is coupled, the method further comprising: switching to the on state said switch during each storage of a voltage by said readout circuit; and switching to the off state said switch during each reading of a voltage stored by said readout circuit.

According to one embodiment, the controlled sensor is a sensor as described above.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional, and material properties.

For the sake of clarity, only the operations and elements that are useful for an understanding of the embodiments described herein have been illustrated and described in detail. In particular, the usual electronic systems comprising an indirect time-of-flight sensor have not been detailed, the described embodiments being compatible with these usual systems. In addition, usual implementations of an iTOF sensor from a plurality of identical iTOF pixels have not been detailed, as the described embodiments of iTOF pixels are compatible with such usual implementations.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation represented in the figures.

Unless specified otherwise, the expressions "around", "approximately", "substantially" and "in the order of" signify within 10%, and preferably within 5%.

Figure 1:
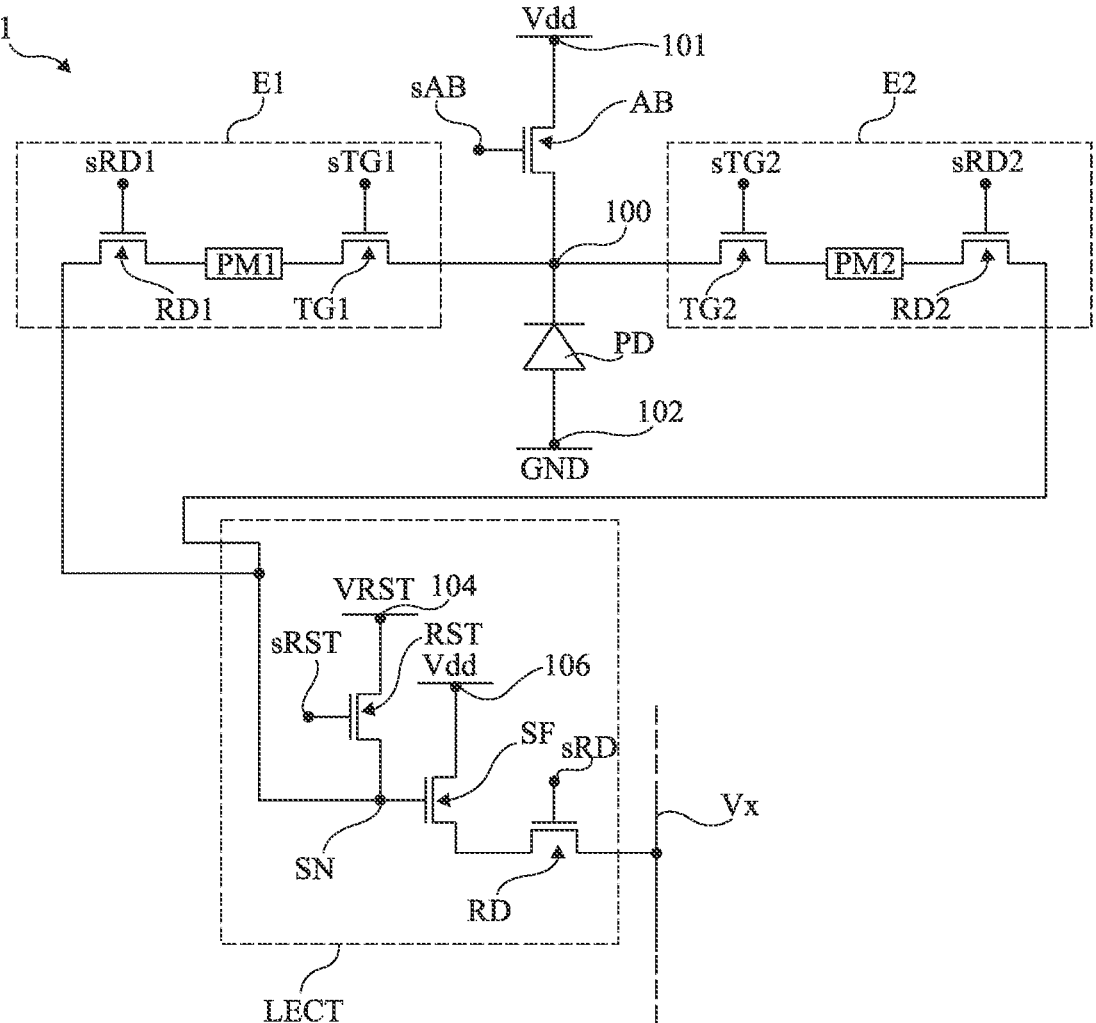
FIG. 1 represents, schematically, an example of a circuit of a pixel of an indirect time-of-flight sensor.

FIG. 1 represents, schematically, an example of a circuit of a pixel 1 of a time-of-flight type sensor, or iTOF pixel. The pixel 1 is said to be in the charge-domain.

The pixel 1 comprises a photoconversion area PD, typically a pinned photodiode.

Preferably, the pixel 1 comprises a switch AB, for example a MOS (Metal Oxide Semiconductor) transistor, connected between a first terminal 100 of the photoconversion area PD, for example the cathode of the photodiode PD, and a node 101 configured to receive a DC supply potential Vdd. The switch AB is controlled by a signal sAB. A second terminal of the photoconversion area PD, for example the anode of the photodiode PD, is connected to a node 102 configured to receive a DC reference potential, for example ground GND.

Pixel 1 comprises N sets Ei, where N is an integer greater than or equal to 2 and i is an integer ranging from 1 to N. In the example of FIG. 1, N is equal to 2 and pixel 1 includes a first set E1 and a second set E2.

Each set Ei comprises a pinned memory, PMi (PM1 and PM2 in the example of FIG. 1), represented very schematically and in block form in FIG. 1.

Each set Ei further comprises a charge transfer device, TGi (TG1 and TG2 in the example of FIG. 1), connected between the electrode 100 of the photoconversion area PD and the memory PMi of the set. Each device TGi is a MOS transistor controlled by a signal, sTGi (sTG1 and sTG2 in the example in FIG. 1). As an example, each device TGi is a transfer gate.

More particularly, in each set Ei, the device TGi has a first conduction terminal coupled, preferably connected, to the electrode 100, a second conduction terminal connected to the memory PMi, and a control terminal configured to receive the signal sTGi.

During an integration phase, the charges photogenerated in the photodiode PD are transferred periodically to each of the pinned memories PMi, at the same frequency but with a different phase, each charge transfer to a memory PMi being implemented by activating, by means of the signal sTGi, the device TGi connected to that memory PMi.

Each set Ei further comprises a switch, RDi (RD1 and RD2 in the example of FIG. 1), for example a MOS transistor, connected between the memory PMi and a readout circuit LECT of the pixel 1. The switch RDi is controlled by a signal, sRDi (sRD1 and sRD2 in the example of FIG. 1).

The readout circuit LECT is configured, during a pixel readout phase successive to an integration phase, and for each set Ei of the pixel 1, to provide at an output, or readout line, Vx of the pixel 1, a signal representing the charges accumulated in the memory PMi of this set Ei. To do this, the charges stored in the memory PMi are transferred to a sense node SN of the circuit LECT by switching to the on state the switch RDi of the set, the switch RDi being connected between the memory PMi and the node SN. Then, the amount of charge transferred to the node SN is converted to a pixel output signal, for example a voltage, available at the output Vx.

In the example represented in FIG. 1, the circuit LECT comprises a MOS transistor RST connected between the node SN and a node 104 configured to receive an initialization potential VRST of the node SN. The RST transistor is controlled by a signal sRST received through its gate. In addition, the LECT circuit comprises a MOS transistor SF connected as a source follower. The transistor SF has its gate connected to the node SN, its drain connected to a node 106 configured to receive a bias potential, typically the supply potential Vdd, and its source coupled, via a switch RD, to an output Vx of the pixel. The switch RD, for example a MOS transistor, is controlled by a signal sRD and is configured to be in the on state during a readout phase of the pixel 1.

The pixel 1 is said to be in the charge domain because, during charge transfers from the photodiode PD to the memories PMi, the memories PMi store the charges, and this amount of stored charge is converted into voltage, by the circuit LECT, when reading each memory PMi.

However, a disadvantage of a pixel in the charge domain is that the pinned memories PMi are sensitive to light. Indeed, when light, for example ambient light, reaches a pinned memory of a pixel in the charge domain, it causes charges to be photogenerated directly into the pinned memory. This leads to a decrease in the signal-to-noise ratio.

To overcome this drawback, it has been proposed to place a light shielding structures around each pinned memory. For example, a metal plate can be formed over each pinned memory to prevent incident light from the pixel reaching the memory. It has also been proposed to fill trenches delimiting each pinned memory with metal to block the passage of light between an area PD of a pixel and a memory PMi adjacent to that area PD. However, these solutions require additional manufacturing steps, which increases the manufacturing complexity and cost of the pixel.

In addition, the pinned memories occupy a non-negligible area of the total pixel area. Thus, reducing the pixel size becomes difficult and problematic. Indeed, to reduce the size of a pixel, because the minimum size of the pinned memories of a pixel is determined by the maximum number of charges that one wishes to store in it, it is then necessary to reduce the size of the photodiode PD of the pixel, which leads to a reduction in the sensitivity of the pixel.

It is proposed here to replace the pinned memories of an iTOF pixel in the charge domain with capacitive elements, in other words, intrinsic capacitances of the nodes of the pixel and/or capacitors. In other words, an iTOF pixel in the voltage domain is proposed.

A capacitive element as defined above is not sensitive to light. In other words, when light reaches such a light-insensitive capacitive element, no charge is photogenerated in that capacitive element. In addition, such a capacitive element is less bulky than a pinned memory, resulting in more compact pixels than equivalent pixels in the charge domain. In particular, a light-insensitive capacitive element is neither a diode nor a pinned diode implementing pinned memory.

More generally, according to one embodiment, an iTOF pixel in the voltage domain comprises at least two sets connected to a photoconversion area of the pixel, each set comprising a charge transfer device connected between the photoconversion area and a light-insensitive capacitive element. Any iTOF pixel in the charge domain can then be adapted into an iTOF pixel in the voltage domain.

According to one embodiment, in each set, the transfer device is connected between the photosensitive area and a node of the set, the light-insensitive capacitive element being the intrinsic capacitance of that node, or the combination of the intrinsic capacitance of that node and a capacitor connected to said node.

Thus, when the transfer device connected between the photoconversion area of a pixel and a light-insensitive capacitive element of that pixel is activated, a current is present at the terminals of the capacitive element as long as the charges are transferred towards the capacitive element, resulting in a variation in the potential difference at the terminals of the capacitive element, and thus a variation in the potential of the node to which the capacitive element is connected and which is coupled to the photoconversion area by the transfer device. The amplitude of the potential variation of this node is then representative of the quantity of transferred charges. Because the quantity of charge transferred is stored, or memorized, as a voltage, namely the voltage of the node connected to the capacitive element and to the transfer device, the pixel is said to be in the voltage domain.

Figures 2, 3:
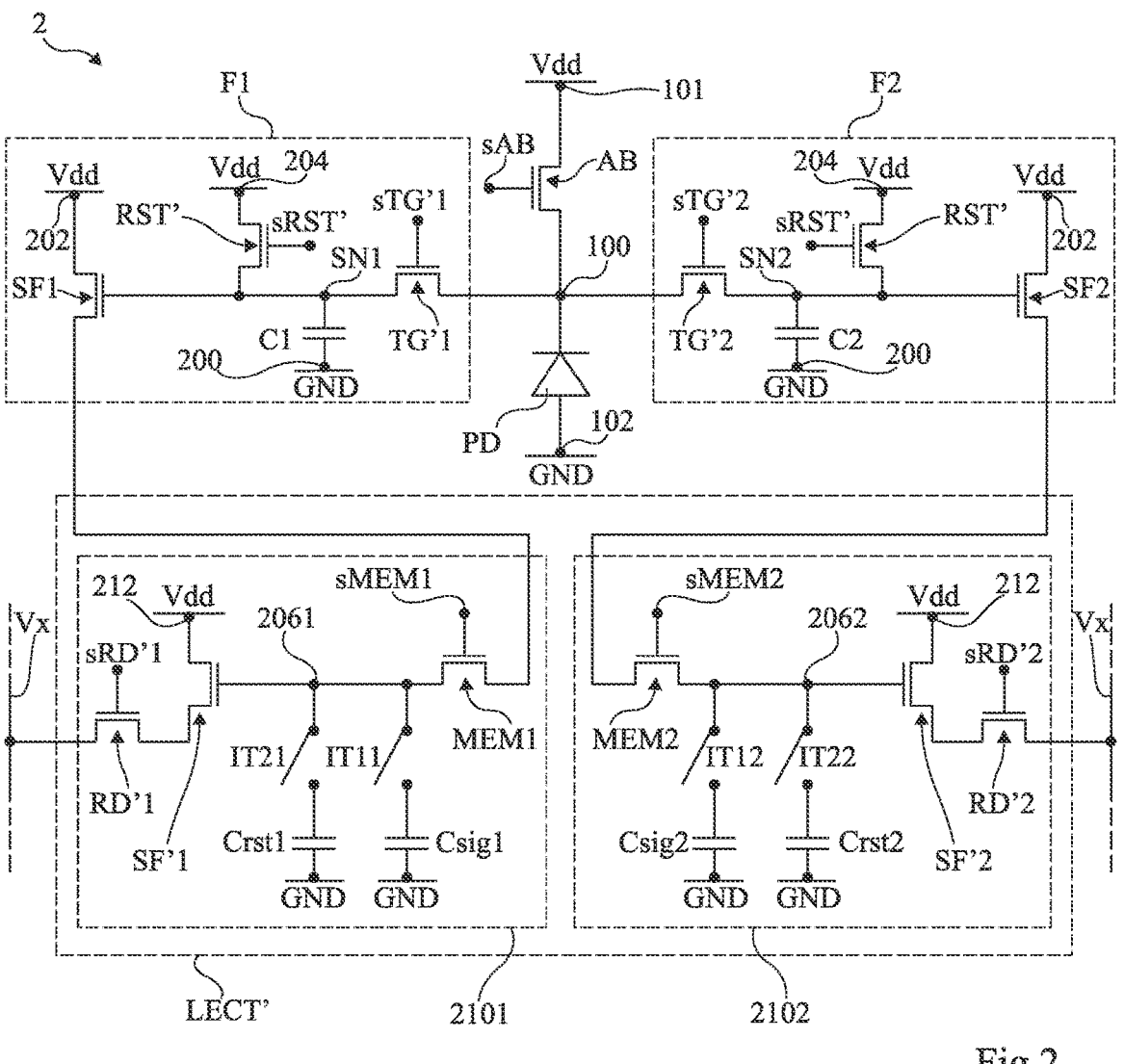
FIG. 2 represents, in a schematic way, an example of one embodiment of a circuit of a pixel of an indirect time-of-flight sensor.
FIG. 3 represents an implementation of a method using an indirect time-of-flight sensor comprising a pixel array of the type represented in FIG. 2.

FIG. 2 represents, schematically, an example of one embodiment of a circuit of a pixel 2 of an indirect time-of-flight sensor, or iTOF pixel 2, in the voltage domain.

The pixel 2 comprises, like the pixel 1, the photoconversion area PD. Preferably, pixel 2 also comprises, like pixel 1, the switch AB connected between terminal 100 of the area PD and the node 101 at the potential Vdd. The other terminal of the area PD is connected to the node 102 configured to receive a reference potential, for example the ground potential GND although different potentials from the ground GND may be applied to the node 102.

Similar to pixel 1, pixel 2 includes N sets Fi and a readout circuit LECT'. Each set Fi is connected between the terminal, or node, 100 and the readout circuit LECT'. In the example represented in FIG. 2, N is equal to 2 and the pixel 2 comprises a first set F1 and a second set F2. However, in other examples not represented, N is greater than 2.

Each set Fi comprises a capacitive element, Ci (C1 and C2 in the example of FIG. 2). Each capacitive element Ci is insensitive to light (meaning that no charge is photogenerated in that capacitive element). Each capacitive element Ci is neither a diode, nor a pinned diode or pinned memory nor is the capacitive element formed exclusively by any sort of a floating diffusion (FD). In each set Fi, the capacitive element Ci is connected to a node, SNi (SN1 and SN2 in the example of FIG. 2) of that set Fi.

According to one embodiment, in each set Fi, the element Ci is constituted by the intrinsic capacitance of the conductive node SNi. According to another embodiment, in each set Fi, the element Ci is constituted by the intrinsic capacitance of the conductive node SNi and by a physical capacitor structure connected between the node SNi and a node 200 configured to receive a reference potential, for example the ground potential GND, although other potentials may be applied to the node 200. For example, when the capacitive element Ci comprises a physical capacitor, this capacitor corresponds to two conductive electrodes (for example, made of metal and/or polysilicon) facing each other and separated from each other by a dielectric layer, one electrode being connected to the conductive SNi node and another electrode being connected to the node 200. This capacitor is preferably a metal-insulator-metal (MIM) capacitor.

Each set Fi further comprises a charge transfer device, TG'i (TG'1 and TG'2 in the example of FIG. 2), connected between the electrode 100 of the photoconversion zone PD and the node SNi of the set Fi. Each device TG'i is controlled by a signal, sTG'i (sTG'1 and sTG'2 in the example of FIG. 2). As an example, each device TG'i is a transfer gate or a MOS transistor.

More particularly, in each set Fi, the device TG'i has a first conduction terminal coupled, preferably connected, to the electrode 100, a second conduction terminal connected to the node SNi, and a control terminal configured to receive the signal sTG'i.

During each phase of light integration by an iTOF sensor comprising a plurality of pixels 2, for example arranged in an array of pixels 2 comprising rows and columns of pixels 2, in each set Fi of each pixel 2, the transfer device TG'i of the set Fi is periodically activated, so as to periodically transfer charges from the area PD to the capacitive element Ci of that set. The activation/deactivation of the device TG'i is controlled by the corresponding signal sTG'i, the signals sTG'i being, for example, provided by a control circuit (not represented) of the pixel 2.

In order for the readout circuit LECT' to obtain, for each set Fi, a signal, typically a voltage, representative of the voltage of the node SNi, each set Fi further comprises a MOS transistor SFi (SF1 and SF2 in the example of FIG. 2) configured as a source-follower. In each set Fi, the transistor SFi has a gate connected to the node SNi, a drain connected to a node 202 configured to receive a bias potential, and a source connected to the circuit LECT'. By way of example, the node 202 receives the potential Vdd although, in other examples not represented, the node 202 may receive a bias potential other than the potential Vdd.

Thus, in each set Fi, when the transistor SFi is saturated, the voltage on the source of the transistor SFi is determined by, or, in other words, is representative of, the voltage on the node SNi.

According to one embodiment, as illustrated in FIG. 2, each set Fi further includes a switch RST', for example a MOS transistor, connected between the node SNi and a node 204 configured to receive an initialization potential of the node SNi. By way of example, the node 204 receives the potential Vdd although, in other examples not represented, this potential may be different from the potential Vdd. For example, in each set Fi, the switch RST' has one conduction terminal connected to the node SNi and another conduction terminal connected to node 204. Each switch RST' is controlled by a signal sRST', for example identical for all the sets Fi, received by its control terminal. When the switch RST' of each set Fi is switched to the on state, the potential of the node SNi is initialized at the potential of the node 204 (by ignoring the voltage drop at the terminals of the switch RST').

According to one embodiment, in an iTOF sensor comprising a plurality of pixels 2, an initialization (or reset) phase of the potentials of the nodes SNi of all the pixels 2 is implemented before each light integration phase. Preferably, this initialization phase is implemented simultaneously for all pixels, for example simultaneously for all nodes SNi of all the pixels 2. As an example, this initialization phase is implemented by switching to the on state simultaneously all switches RST' of all the pixels 2, thanks to a signal sRST' common to all switches RST', this signal sRST' being, for example, provided by a control circuit (not illustrated) of the pixels 2.

During each readout phase of an iTOF sensor comprising a plurality of pixels 2, the readout circuit LECT' is configured, for each set Fi of each pixel 2, to provide a signal representing a first value of the potential of the node SNi of the set in question, namely the value that the potential of the node SNi has at the end of the integration period having preceded this readout phase, or, in other words, at the beginning of the readout phase. For this purpose, at the end of the integration phase, the circuit LECT' receives the voltage from the source of the transistor SFi of the set Fi, this voltage being representative of the first value of the potential of the node SNi. Thus, during each readout phase of the sensor, in each pixel 2 and for each set Fi of the pixel, the readout circuit LECT' is configured to provide the signal representative of the first value of the potential of the node SNi, from the voltage of the source of the transistor SFi at the end of the integration phase preceding this readout phase, i.e., from the voltage available at the source of the transistor SNi at the end of the integration phase preceding this readout phase. The signal provided by the readout circuit LECT' is, for example, a voltage.

As an example, in each pixel 2, the readout circuit LECT' is configured to provide the signal representing the first value of the node SNi of each set on an output Vx, also called readout line Vx or output line Vx, distinct for each set Fi. This is, for example, the case in FIG. 2, where the circuit LECT' is connected to N separate lines Vx.

In other examples not represented, the circuit LECT' is configured to provide the signal representing the first value of the node SNi of each set Fi on an output Vx common for all sets Fi. In other words, the pixel 2 is related to only one output Vx. In this case, during a readout phase of the pixel, the circuit LECT' provides one after the other the signals representing the first value of the nodes SNi of the sets Fi of the pixel 2. For example, in the case where the pixel 2 comprises two sets F1 and F2, during the readout phase of the pixel 2, the circuit LECT' first provides on the output Vx the signal representing the first value of one of the nodes SN1 and SN2, and then, on this same output Vx, the signal representing the first value of the other nodes SN1 and SN2.

For example, when the pixels 2 of the sensor are organized in an array of pixels 2 comprising rows and columns of pixels 2, the line Vx or lines Vx of a pixel 2 are shared by all the pixels of the pixel column to which this pixel 2 belongs.

According to one embodiment, during each readout phase of the sensor iTOF, the readout circuit LECT' of each pixel 2 is further configured, for each set Fi of the pixel 2, to provide a signal, for example a voltage, representing a second value of the potential of the node SNi of the set considered. This second value of the potential of the node SNi is the value of the potential of the node SNi at the end of a phase of initialization of the potential of this node SNi, which is implemented before the integration phase having preceded the readout phase considered. For this, at the end of the initialization phase, the circuit LECT' receives the voltage from the source of the transistor SFi of the set Fi which is representative of this second value of the potential of the node SNi, and, during the readout phase, the LECT' circuit provides the signal representative of the second value of the potential of the SNi node from this voltage received at the end of the initialization phase. Thus, during each readout phase of the sensor, in each pixel 2 and for each set Fi of the pixel 2, the readout circuit LECT' of the pixel 2 is configured to provide the signal representative of the second value of the SNi voltage of this set, from the voltage of the source of the transistor SFi of this set SNi at the end of the initialization phase preceding the integration phase that is followed by this readout phase, i.e., from the voltage available at the source of the transistor SFi at the end of the initialization phase.

When the circuit LECT' of each pixel 2 is configured, for each set Fi of the pixel 2, to provide the signal representative of the first value of the potential of the node SNi and the signal representative of the second value of the potential of the node SNi, the sensor comprising the pixels 2 implements Correlated Double Sampling (CDS).

The implementation of the readout circuit LECT' is within the abilities of the person skilled in the art from the functional indications given above.

One particular embodiment of the readout circuit LECT' of the pixel 2 will now be described in relation to FIG. 2.

In this embodiment, in each pixel 2, the circuit LECT' is configured, for each set Fi of the pixel, to store a signal, for example, a voltage, representing the voltage of the source of the transistor SFi received by the circuit LECT' at the end of the integration phase preceding this readout phase. In other words, at the end of each integration phase and for each set Fi, the circuit LECT' is configured to store a signal, for example a voltage, representative of the first value of the potential of the node SNi of the set Fi.

For this purpose, according to one embodiment, the circuit LECT' comprises, for each set Fi of the pixel 2, a capacitor Csigi (Csig1 and Csig2 in FIG. 2) related to this set, and a switch IT1i (IT11 and IT12 in FIG. 2) related to this Fi set. The switch IT1i, for example a MOS transistor, is connected between the capacitor Csigi and an internal node 206i (2061 and 2062 in FIG. 2) of the circuit LECT', this node 206i being coupled to the source of the transistor SFi of the related set Fi.

Preferably, each capacitor Csigi has a first electrode coupled to the node 206i through the transistor IT1i, and a second electrode connected to a node configured to receive a reference potential, such as ground GND. Preferably, each capacitor Csigi corresponds to two electrodes facing each other and separated from each other by a dielectric layer. In other words, preferably, each capacitor Csigi is different from the only intrinsic capacitance on the terminal of switch IT1i that is opposite to the terminal of the switch IT1i that is connected to the node 206i.

By way of example, as illustrated in FIG. 2, for each set Fi, the circuit LECT' comprises a sub-circuit 210i (2101 and 2102 in FIG. 2) comprising the switch IT1i, the node 206i, and the capacitor Csigi.

For each set Fi, in order to obtain the signal representing the first value of the potential of the node SNi, first a voltage representative of this first value is stored in the capacitor Csigi, by switching to the off state the switch IT1i at the end of the integration period preceding the readout phase considered, preferably simultaneously in all the pixels 2 of the sensor. Then, during this readout phase, the switch IT1i is switched to the on state, preferably simultaneously in all the pixels 2 of a row of pixels, and the signal representing the first value of the potential of the node SNi is obtained from the voltage of the node 206i, i.e., by reading the voltage stored at the terminals of the capacitor Csigi.

In order for the value on the node 206i to be determined by the stored voltage at the terminals of the capacitor Csigi, the readout circuit LECT' comprises a device configured to uncouple the node 206i from the source of the transistor SFi at the time when the signal representing the first value of the potential of the node SNi is obtained from the voltage of the node 206i, i.e., at the time of reading the stored voltage at the terminals of the capacitor Csigi.

According to one embodiment, this device corresponds, for each node 206i, to a switch MEMi (MEM1 and MEM2 in FIG. 2) coupling the node 206i to the source of the corresponding transistor SFi. Each switch MEMi, for example a MOS transistor, is controlled by a signal sMEMi (sMEM1 and sMEM2 in FIG. 2) received by its control terminal. As an example, each circuit 210i comprises a switch MEMi.

In each Fi set of the pixel 2, when storing the source voltage of the transistor SFi at the terminals of the corresponding capacitor Csigi, the switch MEMi is switched to the on state. Furthermore, in each set Fi of the pixel 2, when reading the stored voltage at the terminals of the capacitor Csigi, the switch MEMi is switched to the off state.

According to one embodiment, in order to provide the signal representing the first value of the potential of the node SNi of each set Fi from the readout of the stored voltage at the terminals of the capacitor Csigi, the circuit LECT' comprises a MOS transistor SF'i (SF'1 and SF'2 in FIG. 2) having its gate connected to the node 206i, and a drain configured to receive a bias potential, for example the supply potential Vdd although bias potentials other than the potential Vdd may be provided. The drain of the transistor SF'i is, for example, connected to a node 212 configured to receive this bias potential. In addition, a switch RD'i (RD'1 and RD'2 in FIG. 2) is connected between the source of the transistor SF'i and a readout line Vx of the pixel 2. The switch RD'i is controlled by a signal sRD'i, for example, provided by a control circuit of the pixel 2. By way of example, all the pixels 2 of a same pixel row receive the same signal sRD'i.

The stored voltage at the terminals of the capacitor Csigi can be read by switching to the off state the switch MEMi, switching to the on state the switch IT1i and switching to the on state the switch RD'i. The line Vx connected to the switch RD'i is then at a potential that is determined by the voltage stored at the terminals of the capacitor Csigi, thus by the first value of the potential of the node SNi. In the example of FIG. 2, each switch RD'i is connected to a separate line Vx, so the signals sRDi' can be identical. Thus, it is possible to read in parallel, i.e., simultaneously, the voltages stored at the terminals of all the capacitors Csigi of pixel 2.

As an example, each circuit 210i comprises a transistor SF'i and a switch RD'i.

Preferably, the circuit LECT' is configured to implement correlated double sampling and the circuit LECT' of each pixel 2 is configured, for each set Fi of the pixel, to store a signal, for example a voltage, representative of the source voltage of the transistor SFi that is received by the circuit LECT' at the end of the initialization phase, this voltage being representative of the value of the potential of the node SNi at the end of the initialization phase. In other words, at the end of each initialization phase and for each set Fi, the circuit LECT' is configured to store a signal, for example a voltage, representative of the second value of the potential of the node SNi of the set Fi.

According to one embodiment, the circuit LECT' comprises, for each set Fi of the pixel 2, in addition to the capacitor Csigi, a capacitor Crsti (Crst1 and Crst2 in FIG. 2) related to this set, and a switch IT2i (IT21 and IT22 in FIG. 2) related to this set Fi. The switch IT2i, for example a transistor MOS, is connected between the capacitor Crsti and the node 206i. As an example, as represented in FIG. 2, each circuit, 210i (2101 and 2102 in FIG. 2) comprises the corresponding switch IT2i and the corresponding capacitor Crsti.

Preferably, each capacitor Crsti has a first electrode coupled to the node 206i through the transistor IT2i, and a second electrode connected to a node configured to receive a reference potential, for example the ground GND. Preferably, each capacitor Crsti corresponds to two electrodes facing each other and separated from each other by a dielectric layer. In other words, preferably, each capacitor Crsti is different from the only intrinsic capacitance on the terminal of the switch IT2i that is opposite the terminal of the switch IT2i that is connected to the node 206i. As an example, as represented in FIG. 2, each sub-circuit 210i comprises a switch IT2i, and a capacitor Crsti.

For each set Fi, in order to obtain the signal representing the second value of the potential of the node SNi, first of all, a voltage representative of this second value is stored in the capacitor Crsti, by switching to the off state the switch IT2i at the end of the considered initialization phase, preferably simultaneously in all the pixels 2 of the sensor. Then, during the next readout phase, the switch IT2i is switched to the on state, for example simultaneously in all the pixels 2 of the same row of pixels, and the signal representing the second value of the potential of the node SNi is obtained from the voltage of the node 206i, i.e., by reading the voltage stored at the terminals of the capacitor Crsti.

In each set Fi of the pixel 2, at the end of each integration phase, when storing the voltage of the source of the transistor SFi at the terminals of the corresponding capacitor Crsti, the switch MEMi is switched to the on state. Furthermore, in each set Fi of the pixel 2, during each readout phase, the stored voltage at the terminals of the capacitor Crsti can be read by switching to the off state the switch MEMi, switching to the on state the switch IT2i and switching to the on state the switch RD'i. The line Vx connected to the switch RD'i is then at a potential that is determined by the voltage stored at the terminals of the capacitor Crsti, thus by the second value of the potential of the node SNi. In the example of FIG. 2, where each switch RD'i is connected to a separate line Vx, it is possible to read in parallel, i.e., simultaneously, the voltages stored at the terminals of any capacitor Crsti of the pixel 2.

Preferably, prior to each readout of a stored voltage at the terminals of a capacitor Csigi or Crsti, the potential of the node 206i is set to a determined value prior to switching to the on state the switch IT1i or IT2i respectively, for example by switching to the on state and then to the off state a switch (not represented) connected between the node 206i of the set and a node configured to receive an initialization potential.

This disclosure is not limited to the above-described embodiment of the circuit LECT'.

For example, it may be contemplated that the nodes 206i are conflated. In this case, the circuit LECT' preferably includes a single transistor SF'i and a single switch RD'i, the single switch RD'i being connected to a single line Vx. The memorization of the value of the potential of each node SNi of a pixel 2 at the end of the initialization phase is then implemented sequentially, and not in parallel as previously described. Similarly, storing the value of the potential of each node SNi of the pixel 2 at the end of the integration phase preceding the readout phase, or, in other words, at the beginning of this readout phase, is then also implemented sequentially, and not in parallel as has been described above. This implementation of the circuit LECT' allows the circuit LECT' to comprise fewer transistors SF'i and switches RD'i than the circuit LECT' described relative to FIG. 2.

The person skilled in the art is able to provide other implementations of the LECT' circuit from the functional indications given above.

FIG. 3 represents an implementation of a method by an indirect time-of-flight sensor comprising a plurality, for example an array, of pixels 2 of the type represented in FIG. 2.

The sensor implements several light integration phases, each integration phase being followed by a corresponding readout phase. Each integration phase is preceded by an initialization phase of the potential of the nodes SNi of the pixels 2 of the sensor. Only two initialization phases 300 and 300', two integration phases 302 and 302', and a readout phase 304 corresponding to the integration phase 302 are represented in FIG. 3.

More particularly, the initialization phase 300 begins at an instant t0 corresponding to the end of a previous readout phase and ends at an instant t1 corresponding to the beginning of the next integration phase 302.

For example, between the instants t0 and t1, in each set Fi of each pixel 2 of the sensor, the switch RST' is switched to the on state and then to the off state, so that the potential of the node SNi of the set Fi is at an initial value determined by the potential of the node 204.

Furthermore, in one embodiment where the sensor implements correlated double sampling, the circuit LECT' of each pixel 2 of the sensor stores, for each node SNi of the pixel and at the end of the initialization phase, a signal representing the second value of the potential of that node SNi. Preferably, this storage of the initial state of each node SNi is implemented simultaneously in all pixels of the sensor.

For example, using the particular embodiment of the circuit LECT' described relative to FIG. 2, for each set Fi of each pixel 2 of the sensor, the switch MEMi is switched to the on state, then the switch IT2i is switched to the on state, and is then switched back to the off state. In each pixel 2, these steps are, for example, implemented simultaneously for all the nodes SNi in the pixel.

Preferably, although not detailed here, the phase 300 comprises initializing the area PD of each pixel 2 using the switch AB of that pixel.

The integration phase 302 that begins at instant t1 ends at an instant t2. During the integration phase 302, in each pixel 2 of the sensor, the devices TG'i are activated periodically, but with a phase with respect to the emission of the modulated light that is different for each device TG'i. During the integration phase, preferably, all the pixels 2 of the sensor are controlled in the same way, or, in other words, simultaneously.

At the end of the integration phase 302, between instant t2 and a later instant t3 corresponding to the beginning of the next readout phase 304, the circuit LECT' of each pixel 2 of the sensor stores, for each node SNi of the pixel, a signal representing the first value of the potential of that node SNi. Preferably, this storage of the state of each node SNi at the end of the integration phase is implemented simultaneously in all the pixels of the sensor.

For example, using the particular embodiment of the circuit LECT' described relative to FIG. 2, for each set Fi of each pixel 2 of the sensor, the switch MEMi is switched to the on state, then the IT1$i$ switch is switched to the on state and then switched back to the off state.

The readout phase 304 starts at the instant t3 and continues until an instant t0' corresponding to the start of the next initialization phase 300'.

Between the instants t3 and t0', the pixels of the sensor are read, preferably by reading the rows of pixels one after the other, with all the pixels of a row being read simultaneously during the reading of that row.

During the readout of each pixel 2, its readout circuit LECT' provides, for each set Fi of the pixel 2, a signal representing the first value of the potential of the corresponding node SNi, i.e., the value of this potential at the end of the previous integration phase.

For example, taking the particular embodiment of the circuit LECT' described relative to FIG. 2, for each set Fi of each pixel 2, this is implemented by switching to the on state the switch IT1$i$ and the switch RD'i, while the MEMi switch is switched to the off state.

Furthermore, according to one embodiment where the sensor implements correlated double sampling, when reading each pixel 2, its readout circuit LECT' provides, for each set Fi of the pixel 2, a signal representing the second value of the potential of the corresponding node SNi, in other words, the value of this potential at the end of the previous initialization phase.

For example, taking the particular embodiment of the circuit LECT' described relative to FIG. 2, for each set Fi of each pixel 2, this is implemented by switching to the on state the switch IT2$i$ and the switch RD'i, while the switch MEMi is switched to the off state.

As an example, the switch RD'i of each pixel 2 may remain switched to the on state throughout the readout of that pixel 2.

Furthermore, preferably, for each set Fi, when switch IT1$i$ is switched to the on state, respectively switched to the off state, the switch IT2$i$ is switched to the off state, respectively switched to the on state, and vice versa.

At the instant t0' the initialization phase 300' begins. The implementation of this phase 300', and, more generally, of each initialization phase, is identical to that described for the phase 300 between the instants t0 and t1.

The phase 300' ends at an instant t1', corresponding to the beginning of the following integration phase 302'. The implementation of this phase 302', and, more generally, of each integration phase, is identical to that described for the phase 302 between the instants t1 and t2.

The integration phase 302' ends at an instant t2'. At the end of the integration phase 302', between the instant t2' and a later instant not represented corresponding to the beginning of the next readout phase, the LECT' circuit of each pixel 2 of the sensor memorizes, for each node SNi of the pixel, a signal representing the first value of the potential of this node SNi. The implementation of this storage phase, and, more generally, of each storage phase of a signal representative of the first value of the potential of a node SNi at the end of an integration period is identical to that described between the instants t2 and t3. Furthermore, the implementation of the next readout phase, more generally, of each readout phase, is identical to that described for phase 300 between the instants t3 and t0'.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

The invention claimed is:

1. An indirect time-of-flight type sensor comprising a plurality of pixels, wherein each pixel comprises:
   a photoconversion area;
   a readout circuit; and
   at least two circuit sets, wherein each circuit set comprises:
      a capacitive element connected to a first node of the circuit set, wherein said capacitive element is formed by first and second conductive electrodes separated by a dielectric layer;
      a controllable charge transfer device connected between a first electrode of the photoconversion area and the first node; and
      a first transistor having a gate connected to the first node, a source connected to the readout circuit and a drain configured to receive a bias potential;
   wherein the readout circuit comprises:
      a first capacitor related to said circuit set; and
      a first switch related to said circuit set, the first switch being connected between the first capacitor and an internal node of the readout circuit, said internal node being coupled to the source of the first transistor; and
   wherein said internal node of the readout circuit is distinct for each circuit set and is coupled to the source of the first transistor of said circuit set by a switch of the readout circuit.

2. The sensor according to claim 1, wherein each circuit set further comprises a switch having a first conduction terminal connected to the first node and a second conduction terminal configured to receive an initialization potential for application to the first node.

3. The sensor according to claim 1, wherein the capacitive element of each circuit set further comprises an intrinsic capacitance of the first node.

4. The sensor according to claim 1, wherein the second conductive electrode of the capacitive element is configured to receive a reference potential.

5. The sensor according to claim 1, wherein during each readout phase of the sensor, the readout circuit is configured to provide a signal representing a first value of a voltage of the first node that is generated from a source voltage of the first transistor at the end of a light integration phase preceding said readout phase.

6. The sensor according to claim 5, wherein during each readout phase of the sensor, the readout circuit is further configured to provide a signal representing a second value of the voltage of the first node that is generated from the source voltage of the first transistor at the end of an initialization phase preceding the integration phase.

7. The sensor according to claim 1, wherein the readout circuit further comprises:
   a second capacitor related to said circuit set; and
   a second switch related to said circuit set, the second switch being connected between the second capacitor and said internal node.

8. An indirect time-of-flight type sensor comprising a plurality of pixels, wherein each pixel comprises:
   a photoconversion area;
   a readout circuit; and
   at least two circuit sets, wherein each circuit set comprises:

a capacitive element connected to a first node of the circuit set, wherein said capacitive element is formed by first and second conductive electrodes separated by a dielectric layer;

a controllable charge transfer device connected between a first electrode of the photoconversion area and the first node; and a first transistor having a gate connected to the first node, a source connected to the readout circuit and a drain configured to receive a bias potential;

wherein the readout circuit comprises:

a first capacitor related to said circuit set;

a first switch related to said circuit set, the first switch being connected between the first capacitor and an internal node of the readout circuit, said internal node being coupled to the source of the first transistor;

a further transistor having a gate connected to said internal node and a drain configured to receive a bias potential; and a switch connected between the source of said further transistor and an output of the pixel.

9. The sensor according to claim 8, wherein each circuit set further comprises a switch having a first conduction terminal connected to the first node and a second conduction terminal configured to receive an initialization potential for application to the first node.

10. The sensor according to claim 8, wherein the capacitive element of each circuit set further comprises an intrinsic capacitance of the first node.

11. The sensor according to claim 8, wherein the second conductive electrode of the capacitive element is configured to receive a reference potential.

12. The sensor according to claim 8, wherein during each readout phase of the sensor, the readout circuit is configured to provide a signal representing a first value of a voltage of the first node that is generated from a source voltage of the first transistor at the end of a light integration phase preceding said readout phase.

13. The sensor according to claim 12, wherein during each readout phase of the sensor, the readout circuit is further configured to provide a signal representing a second value of the voltage of the first node that is generated from the source voltage of the first transistor at the end of an initialization phase preceding the integration phase.

14. The sensor according to claim 8, wherein the readout circuit further comprises:

a second capacitor related to said circuit set; and a second switch related to said circuit set, the second switch being connected between the second capacitor and said internal node.

15. A method for controlling an indirect time-of-flight type sensor that comprises a plurality of pixels each having: a photoconversion area; a readout circuit; and at least two circuit sets, wherein each circuit set comprises:

a capacitive element connected to a first node of the circuit set, wherein said capacitive element is formed by first and second conductive electrodes separated by a dielectric layer;

a controllable charge transfer device connected between a first electrode of the photoconversion area and the first node; and a first transistor having a gate connected to the first node, a source connected to the readout circuit and a drain configured to receive a bias potential;

the method comprising:

during each light integration phase by the sensor, in each set of each pixel, periodically activating the controllable charge transfer device to periodically transfer charges from the photoconversion area to generate a voltage stored on the capacitive element; and during a readout phase of the sensor implemented after each integration phase, obtaining, by the readout circuit, a signal representing a first value of said voltage stored on the capacitive element, from a voltage of a source of the first transistor at the end of the integration phase preceding said readout phase;

wherein obtaining the signal representative of said first value comprises:

at the end of each integration period, opening a first switch of the readout circuit to store said voltage at the terminals of a first capacitor of the readout circuit, the first capacitor and the first switch being related to said circuit set, the first switch being connected between said first capacitor and an internal node of the readout circuit, said internal node being coupled to the source of the first transistor, and the stored voltage being representative of the voltage of the source of the first transistor at the end of said integration phase; and during the readout phase following said integration phase, obtaining said signal by switching to the on state the first switch to read the stored voltage across the first capacitor;

the method further comprising:

performing an initialization phase of the voltage stored on said capacitive element before each integration phase; and during the readout phase implemented after each integration phase, obtaining, by the readout circuit, a signal representing a second voltage value of the first node of said circuit set, from the source voltage of the first transistor at the end of the initialization phase preceding the integration phase; and wherein, for each set of each pixel, obtaining the signal representative of the second value comprises:

at the end of each initialization phase, switching to the off state a second switch of the readout circuit for storing a voltage at the terminals of a second capacitor of the readout circuit, the second capacitor and the second switch being related to said circuit set, the second switch being connected between said second capacitor and the internal node coupled to the source of the first transistor of said set, and the stored voltage being representative of the voltage of the source of the first transistor of said set at the end of the initialization phase; and during the readout phase following the integration phase that follows the readout phase, obtaining the signal by switching the second switch to the on state related to said circuit set to read the stored voltage at the terminals of the second capacitor.

16. The method according to claim 15, further comprising:

performing an initialization phase of the voltage stored on the capacitive element before each integration phase; and during the readout phase implemented after each integration phase, obtaining, by the readout circuit of said pixel and for each set of said pixel, a signal representing a second value of said voltage stored on the capacitive element, from the source voltage of the first transistor at the end of the initialization phase preceding the integration phase.

17. A method for controlling an indirect time-of-flight type sensor that comprises a plurality of pixels each having: a photoconversion area; a readout circuit; and at least two circuit sets, wherein each circuit set comprises:

a capacitive element connected to a first node of the circuit set, wherein said capacitive element is formed by first and second conductive electrodes separated by a dielectric layer;

a controllable charge transfer device connected between a first electrode of the photoconversion area and the first node; and a first transistor having a gate connected to the first node, a source connected to the readout circuit and a drain configured to receive a bias potential;

the method comprising:

during each light integration phase by the sensor, in each set of each pixel, periodically activating the controllable charge transfer device to periodically transfer charges from the photoconversion area to generate a voltage stored on the capacitive element; and during a readout phase of the sensor implemented after each integration phase, obtaining, by the readout circuit, a signal representing a first value of said voltage stored on the capacitive element, from a voltage of a source of the first transistor at the end of the integration phase preceding said readout phase;

wherein obtaining the signal representative of said first value comprises:

at the end of each integration period, opening a first switch of the readout circuit to store said voltage at the terminals of a first capacitor of the readout circuit, the first capacitor and the first switch being related to said circuit set, the first switch being connected between said first capacitor and an internal node of the readout circuit, said internal node being coupled to the source of the first transistor, and the stored voltage being representative of the voltage of the source of the first transistor at the end of said integration phase; and during the readout phase following said integration phase, obtaining said signal by switching to the on state the first switch to read the stored voltage across the first capacitor;

wherein, for each circuit set, the readout circuit comprises a switch connected between the source of the first transistor and the internal node to which the source of the first transistor is coupled, the method further comprising:

switching said switch to the on state during each storage of a voltage by said readout circuit; and switching said switch to the off state during each reading of a voltage stored by said readout circuit.

18. The method according to claim 17, further comprising:

performing an initialization phase of the voltage stored on the capacitive element before each integration phase; and during the readout phase implemented after each integration phase, obtaining, by the readout circuit of said pixel and for each set of said pixel, a signal representing a second value of said voltage stored on the capacitive element, from the source voltage of the first transistor at the end of the initialization phase preceding the integration phase.

* * * * *